US006993287B2

(12) United States Patent
O'Neill

(10) Patent No.: US 6,993,287 B2
(45) Date of Patent: Jan. 31, 2006

(54) REPEATER SYSTEM FOR STRONG SIGNAL ENVIRONMENTS

(75) Inventor: Frank P. O'Neill, Boulder, CO (US)

(73) Assignee: Four Bars Clarity, LLC, Westminster, CO (US)

( * ) Notice: Subject to any disclaimer, the term of this patent is extended or adjusted under 35 U.S.C. 154(b) by 0 days.

(21) Appl. No.: 10/794,458

(22) Filed: Mar. 4, 2004

(65) Prior Publication Data

US 2004/0176027 A1 Sep. 9, 2004

Related U.S. Application Data

(60) Provisional application No. 60/451,397, filed on Mar. 4, 2003.

(51) Int. Cl.
*H04B 7/15* (2006.01)

(52) U.S. Cl. ............... 455/11.1; 455/9; 455/67.11; 455/452.1

(58) Field of Classification Search ............ 455/9, 455/11.1, 14, 15, 7, 25, 562.1, 422.1, 424, 455/509, 450, 452.1, 503, 63.1, 63.4, 67.11, 455/445, 446
See application file for complete search history.

(56) References Cited

U.S. PATENT DOCUMENTS

| 2,559,613 | A | 7/1951 | Halstead | 250/15 |
|---|---|---|---|---|
| 3,028,489 | A | 4/1962 | Chasek | 250/15 |
| 4,001,834 | A | 1/1977 | Smith | 343/754 |
| 4,317,216 | A | 2/1982 | Kaegebein | 455/16 |
| 4,360,927 | A | 11/1982 | Bowen et al. | 455/17 |
| 4,475,243 | A | 10/1984 | Batlivala et al. | 455/22 |
| 4,704,733 | A | 11/1987 | Kawano | 455/16 |
| 4,727,590 | A | 2/1988 | Kawano et al. | 455/33 |
| 4,754,495 | A | 6/1988 | Kawano et al. | 455/17 |
| 4,941,200 | A | 7/1990 | Leslie et al. | 455/17 |
| 5,095,528 | A | 3/1992 | Leslie et al. | 455/10 |
| 5,204,970 | A | 4/1993 | Stengel et al. | 455/69 |
| 5,404,570 | A | 4/1995 | Charas et al. | 455/22 |
| 5,457,814 | A | 10/1995 | Myrskog et al. | 455/127 |
| RE36,076 | E | 2/1999 | Bryant et al. | 343/713 |
| 5,887,261 | A | 3/1999 | Csapo et al. | 455/450 |

(Continued)

FOREIGN PATENT DOCUMENTS

EP 0 605 182 12/1993

(Continued)

OTHER PUBLICATIONS

F.Sapienza and S. Kim; "Dominant Pilot Recovery in IS-95 CDMA Systems Using Repeaters"; IEICE Trans. Commun., vol. E84-B, No.1, Jan. 2001; pp. 134-137.

(Continued)

*Primary Examiner*—Tilahun Gesesse
*Assistant Examiner*—John J. Lee
(74) *Attorney, Agent, or Firm*—Robert G. Crouch; Marsh Fischmann & Breyfogle, LLP

(57) ABSTRACT

A repeater system combines co-located antennas, limited and controlled downlink signal amplification, stability management and an amplification indicator to create a user-installed solution to co-channel interference within cellular systems, in strong signal environments such as elevated locations or high-rise building. The invention may be particularly relevant to cellular systems, such as CDMA, that allow limited imbalance between uplink and downlink path losses, thus enabling the design of an inexpensive downlink repeater which creates moderate signal amplification for selected line-of-sight signals, defeating co-channel interference over a small area. Signal amplification is maintained at a level below the capacity of the system to support imbalance, guaranteeing reliable cellular calls.

62 Claims, 10 Drawing Sheets

U.S. PATENT DOCUMENTS

| | | | |
|---|---|---|---|
| 5,912,641 A | 6/1999 | Dietrich | 342/354 |
| 5,983,072 A * | 11/1999 | Schroderus | 455/11.1 |
| 6,009,324 A | 12/1999 | Pravitz et al. | 455/423 |
| 6,188,872 B1 | 2/2001 | Nagira et al. | 455/11.1 |
| 6,282,434 B1 | 8/2001 | Johannisson et al. | 455/562 |
| 6,336,042 B1 | 1/2002 | Dawson et al. | 455/562 |
| 6,353,729 B1 | 3/2002 | Bassirat | 455/11.1 |
| 6,373,833 B1 | 4/2002 | Suonvieri et al. | 370/347 |
| 6,381,230 B1 | 4/2002 | Wheatley III et al. | 370/328 |
| 6,381,473 B1 * | 4/2002 | Niki | 455/16 |
| 6,400,959 B1 | 6/2002 | Nagira et al. | 455/503 |
| 6,445,904 B1 | 9/2002 | Lovinggood et al. | 455/7 |
| 6,459,725 B1 | 10/2002 | Baker et al. | 375/214 |
| 6,584,081 B1 | 6/2003 | Lee et al. | 370/315 |
| 6,728,514 B2 * | 4/2004 | Bandeira et al. | 455/11.1 |
| 6,731,904 B1 | 5/2004 | Judd | |
| 6,745,003 B1 | 6/2004 | Maca | |
| 6,748,212 B2 * | 6/2004 | Schmutz et al. | 455/67.11 |
| 6,868,254 B2 * | 3/2005 | Weissman | 455/11.1 |
| 2002/0044594 A1 | 4/2002 | Bongfeldt | |
| 2002/0045431 A1 | 4/2002 | Bongfeldt | |
| 2002/0045461 A1 | 4/2002 | Bongfeldt | 455/522 |
| 2002/0093926 A1 | 7/2002 | Kilfoyle | 370/335 |
| 2004/0097189 A1 | 5/2004 | Bongfeldt | |
| 2004/0110469 A1 | 6/2004 | Judd | |
| 2004/0166802 A1 | 8/2004 | McKay et al. | |

FOREIGN PATENT DOCUMENTS

| | | |
|---|---|---|
| JP | 2000-183797 | 6/2000 |
| WO | WO 95/31866 | 11/1995 |
| WO | WO 01/17059 | 3/2001 |
| WO | WO02/33996 | 4/2002 |
| WO | WO 03/013005 | 2/2003 |
| WO | WO 03/013028 | 2/2003 |

OTHER PUBLICATIONS

S. Park, W. Kim, and B. Kwon; "An Analysis of Effect of Wireless Network by a Repeater in CDMA System"; 2001; pp. 2781-2785.

Spotwave Wireless White Paper; "Adaptive Repeater Concepts"; Mar. 2003; pp. 1-4.

* cited by examiner

REPEATER SYSTEM FOR STRONG SIGNAL ENVIRONMENTS

CROSS-REFERENCE TO RELATED APPLICATIONS

This application claims priority from U.S. Provisional Patent Application No. 60/451,397, filed Mar. 4, 2003, entitled "Personal Repeater for Cellular Systems", the contents of which are incorporated herein by reference.

FIELD OF THE INVENTION

This present invention relates generally to repeater systems for mobile communication systems such as cellular telephone systems, and more particularly to imbalanced downlink repeater systems.

BACKGROUND OF THE INVENTION

As is well known, cellular and PCS systems provide two-way audio and data communications to subscribers, deploying hundreds of cell sites in a typical large city to create coverage over 95% or more of the targeted area. Downlink signals are transmitted to cellular subscriber telephones from directional base station antennas mounted at 30–100 ft above ground level. Uplink signals are received from subscribers by the same directional antennas.

In the United States in 2003, there were 127M subscribers to the cellular service providers available in each urban market. World market size was about 800M in 2003. Subscribers with telephones using CDMA technologies represent 44% of the U.S. market, while subscribers with telephones using TDMA, GSM, and AMPS technologies represent the other 56%.

Power control algorithms in the cellular network establish and vary the uplink power levels to be transmitted from the subscriber unit (cell phone) in order to maintain good call quality and to minimize interference to other calls. Downlink power levels are either static, or are varied to a lesser degree, relying on information from the subscriber unit in order to determine what downlink power levels will give good audio quality. Measurements of uplink signal quality are performed by the base stations and then power control commands are issued to the subscriber units to maintain a minimum or ideal signal quality. Cellular systems are designed for a "balanced link" so that the uplink and downlink cell radii are the same, and so that uplink and downlink handoff boundaries are coincident. Balanced in this sense may mean less than 1 dB of difference between the two directions.

In CDMA systems, subscriber unit transmit power is initially based on the received downlink power, received from a fixed pilot power level that all base stations transmit. The subscriber unit uses its received power, and the knowledge that, on average, the path loss is the same for uplink and downlink (balanced), to calculate an appropriate uplink power to transmit with in order to meet the same signal quality requirement as that used on the downlink. Once call setup has begun, the uplink receiver at the base station takes over subscriber power control by transmitting messages to the subscriber, incrementing power up or down 800 times per second to maintain a target signal quality level. Uplink power control then is substantially independent from the received downlink signal level once call setup begins, and can offset the link balance up to a programmed amount.

Imbalance in path loss between the downlink direction and the uplink direction occurs when a phenomenon known as fast-fading (same as small-scale fading) occurs independently on the uplink and downlink, leading to so called "opposite fading." Fast fades can represent drops in average power, every half-wavelength or so, of 20 dB or more. So, the uplink and downlink can be temporarily offset by 20 dB or more at times. Longer-term imbalance can also occur due to system calibration errors, due to noise rise fluctuations at the base station receiver, and due to variations in diversity antenna gain.

Typical causes of poor call quality include insufficient capacity, weak coverage, and strong interference. Capacity is the ability to handle many calls (e.g., a lack of capacity results in a blocked call). Capacity can be increased by re-using the frequencies allocated to that service provider many times over in a single city. TDMA, GSM, and AMPS systems use seven-cell reuse patterns, meaning adjacent cells use different frequency channels and/or time slots to prevent co-channel interference. CDMA uses a one-cell reuse pattern, meaning every cell uses the same frequency channel all of the time. In this case, talk channels are separated by coding.

Coverage holes sometimes occur in valleys, tunnels, buildings, and in places where there are no nearby base stations. The coverage hole in a building is either the central area of a floor, away from the windows, or the entire floor. Generally, the upper floors of tall buildings in urban areas have very strong signals from several LOS or near-LOS base stations. Under LOS conditions, path loss behaves approximately according to $d^2$ (where d is the one-way distance between the antenna system of the base station and the antenna of the subscriber unit), which means losses increase 4x (or 6 dB) for each doubling of distance between the base station and the subscriber unit. Under LOS conditions, the subscriber can potentially see the base station. Under near-LOS conditions, there may be additional losses, such as those caused by diffraction, which bends the rays coming from the base station as they pass by the edge of an obstruction. In LOS and near-LOS conditions, most of the energy arriving at the subscriber unit occurs within a narrow angular spread from one general direction.

The cellular concept works because of terrestrial propagation, providing isolation between cells using the same frequency (co-channel cells) via manmade clutter, trees, and terrain. For non-LOS signal paths, path loss behaves approximately according to $d^4$, meaning loss increases 16x (or 12 dB) for each doubling of distance between cell site and subscriber unit. As long as a user is on or near ground level, the system will work as planned and provide nearly interference-free performance with predictable handoff boundaries. In urban areas for subscribers on the ground, non-LOS conditions prevail, because of the interceding clutter, and the radio energy is scattered over a nearly 360° angular spread, arriving at the subscriber from many directions at once, summing at the omni-directional antenna.

One problem that occurs in strong-signal locations is co-channel interference. Co-channel interference occurs when the signal received from two or more cell sites using the same frequency are comparable in signal strength, resulting in poor audio quality or the inability to place or receive a phone call. This may occur, for instance, on the upper floors (e.g., floor 6 and up) of high-rise buildings, such as apartments and offices, because of the breakdown of the terrestrial cellular concept and the occurrence of LOS and near-LOS conditions with several nearby base stations. When a subscriber unit located in such a location "sees"

several co-channel cell sites, poor audio quality or "no service" occurs for the user and the spectrum operator experiences a reduction in billable airtime. All technologies experience co-channel interference on uplink and/or downlink. Strong signals in high-rise buildings are typically in the range of −85 dBm to −50 dBm. Because of the strong signal levels, the subscriber unit is well within the uplink and downlink range limits of the cell design.

CDMA is particularly vulnerable to this problem. CDMA co-channel interference is called pilot pollution. CDMA is more susceptible to co-channel interference in elevated locations than other technologies because of one-cell reuse, instead of the seven-cell reuse used by TDMA, GSM, and AMPS systems. Once as many as four-to-six pilot signals (cells) are received by a subscriber unit at approximately the same signal strength/quality, the telephone cannot lock onto a signal and it may be difficult to impossible to obtain service (calls cannot be placed or received)

Even if service is obtained, the user experiencing pilot pollution may hear a break-up in the audio signal as he/she moves about the room. Since the uplink power control in CDMA has a dynamic range of 80 dB and is managed well, pilot pollution is generally only a problem in the downlink direction. While the presence of an uplink transmission from a subscriber unit in a high-rise building may have an effect on many CDMA base stations, possibly decreasing capacity slightly, the power control algorithms keep all current phone calls equal in received power level so no one call is interfered with. It is estimated that ten to twenty-five percent of windowed rooms located on or above the sixth floor have pilot pollution.

There are several million high-rise office and apartment rooms in the U.S., and interference is usually the strongest nearer the window, where there is LOS visibility to several base stations. Generally, the interference diminishes as the user moves away from the window and the associated outage volume, and into the core of the building. This is because the building acts as a directional antenna, selectively attenuating some of the co-channel signals, resulting in less interference. Often, one side of a building will have the problem and the other side will not. As a result, co-channel interference tends to concentrate in a subset of the windowed rooms within an affected building, and only some individuals will require a solution. In other situations, an entire floor may experience co-channel interference, and there may be several or many residents who want to restore cellular service.

Unfortunately, subscribers cannot distinguish, generally, between an interference problem and a coverage problem. The subscriber just experiences poor audio or no service. As a result, the only options available to subscribers are to complain to their provider and/or change providers (churn). Since there is incomplete feedback to the provider as to the nature of a customer's problem, the provider may have insufficient information to design a customer-specific solution. Twenty million CDMA subscribers are expected to leave (churn) their U.S. provider in 2004 due to coverage, interference, or pricing (based on 127M subs, average churn of 37% per year, and 44% CDMA).

Two-way personal repeaters and two-way higher-power repeaters are "coverage repeaters," designed to solve coverage problems due to weak signals in outdoor and indoor locations using balanced amplification of uplink and downlink. Balanced amplification of both links maintains the "balanced link" design, which is important in a weak signal condition since it is desirable to extend both uplink and downlink cell radii equally into the weak signal area. Coverage repeaters are occasionally applied to interference problems. Coverage repeaters are designed for larger areas, such as partial floors, whole floors, or whole buildings, and are not economical for smaller areas of interference (e.g. an apartment or office room). Furthermore, an indoor coverage repeater installation includes a remotely-mounted (not collocated) highly directional pickoff antenna (e.g. <30° beamwidth), often a Yagi, to pick-off a single base station (known as a donor cell). The pickoff antenna is usually placed at a higher elevation (such as the roof of the building) than the area of weak coverage in order to collect a strong and particular LOS signal, unavailable at the subscriber unit, and must be positioned/adjusted to point at the desired donor cell. The signal gain experienced by the subscriber is as dependent on the signal field at the pickoff antenna as it is on the amplifier gain and the antenna gains. When applying coverage repeaters to interference problems, a remote pickoff antenna is still needed in order to establish the donor signal well above the noise floor and above adjacent spectrum signals prior to amplification so that the indoor re-radiating antenna does not cause interference to other-system subscribers. The installation includes a coaxial run to relay the pickoff signal back to the repeater unit and indoor re-radiating antenna(s). The installation also includes a downlink and uplink amplifier chain and an uplink interference control mechanism, via a control circuit and/or operator coordination/engineering, that sets gain appropriately in order to avoid interference to the larger outdoor system. The installation also includes setting downlink gain, either manually, or automatically, to match uplink gain and avoid oscillation due to excessive antenna-antenna feedback. The installation further includes a re-radiating antenna or a distributed antenna system. Often, a method for monitoring the repeater for malfunction is incorporated in the installation to notify the operator of potential interference to the larger system. Lastly, personal (coverage) repeaters are lower power version of standard repeaters, have lower gain (e.g. 50–60 dB), and are designed to serve a single floor or partial floor.

Coverage repeaters have the following disadvantages: they are costly, they require engineering, and they are optimized for large areas shared by many subscribers. They are expensive—$500 to $3000 for personal repeaters. A weatherproof outdoor antenna, remote mounting, a highly-directional pickoff, controlling the uplink gain (circuit and/or engineering), installing a coaxial run, and system monitoring all add cost to a repeater installation. Coverage repeaters require complex installation because a donor site must be selected and a coaxial cable run and roof/outdoor pickoff antenna mounting is required with a hole through the roof or wall. They run the risk of system interference and require engineering and operator coordination. The solution is not cost effective for an individual experiencing co-channel interference within an office or apartment. Many of the elements are intended to address other issues than an individual high-rise interference problem. These elements include a highly-directional antenna, uplink gain, uplink interference control, remote pickoff antenna mounting and the associated coaxial run, and repeater monitoring to protect the system from interference. Lastly, the pickoff signal strength is unpredictable (until a signal measurement is made at the pickoff location), so the gain needed in the user ambient environment is somewhat unknown.

It is important to recognize that mobile telecommunication systems are always designed to be balanced systems, in that the downlink path losses are equal to the uplink path losses. This is done so that the cell boundaries (areas where hand-offs occur) are the same for both the downlink and uplink directions. Furthermore, all repeater systems are designed to preserve or restore balance in or to the mobile telecommunication system. This is so ingrained into designs that there can be said to be a "culture of balance" in which everyone accepts it as a given that they must achieve and maintain a balanced system.

It is against this background and with a desire to improve on the prior art that the present invention has been developed.

SUMMARY OF THE INVENTION

In view of the foregoing, a broad objective of the present invention is to reduce co-channel interference in portable telephone systems. Another objective of the present invention is to reduce co-channel interference in a manner that is affordable and easily installable by a consumer. Another objective is to minimize degradation of performance of any other part of the same or other portable telephone systems.

In carrying out these and other objectives, features, and advantages of the present invention, a repeater is provided for a mobile communication system having a plurality of base stations and subscriber units that communicate via RF signals. The repeater includes a receive antenna that is directed toward one of the base stations to receive transmitted RF signals from the base station, the receive antenna generating a received signal therefrom. The repeater also includes an amplifier receptive of the received signal, the amplifier amplifying the level of the received signal to generate an amplified signal. The repeater further includes a transmit antenna located proximate to the receive antenna, the transmit antenna being receptive of the amplified signal, the transmit antenna transmitting RF signals within a local area to subscriber units located nearby. The repeater operates in the downlink direction between the base station and the subscriber units near the repeater and the presence of the repeater in the downlink direction causes an intentional imbalance in total losses between the downlink and the uplink directions.

The RF signals received by the receive antenna and the RF signals transmitted by the transmit antenna may be at substantially the same frequency. The repeater may further include a repeater housing in which the receive and transmit antennas are located. The receive and transmit antennas may be located within two meters of each other. The amplifier may provide an external indication of the magnitude of amplification. The amplifier may include circuitry therein to substantially prevent saturation. The circuitry may substantially prevent saturation by periodically incrementing the magnitude of amplification toward an oscillation condition and testing for same. The circuitry may reset the magnitude of amplification to a smaller level during periodic testing for oscillation, and to a much smaller level for sudden occurrences of oscillation, in order to minimize the length of time for which steady amplification is interrupted.

The subscriber may optimally position the receive and transmit antennas of the repeater. The subscriber may use received audio quality when using the subscriber unit to optimally position the receive and transmit antennas of the repeater. The amplifier may provide an external indication of the magnitude of amplification and wherein the subscriber uses the external indication to optimally position the receive and transmit antennas of the repeater. The subscriber units may include an indication of received signal strength and wherein the subscriber uses the indication to optimally position the receive and transmit antennas of the repeater.

The repeater may be effective in substantially eliminating co-channel interference in the vicinity of the repeater. The repeater may be effective in substantially eliminating co-channel interference within ten meters of the repeater. The subscriber units and the receive and transmit antennas of the repeater may be all located in the vicinity of each other and all in an environment receiving signals of adequate signal strength from multiple base stations. The amplifier may include circuitry therein to substantially prevent saturation.

The mobile telecommunication system may include a downlink direction in which signals are transmitted from the base stations to the subscriber units and an uplink direction in which signals are transmitted from the subscriber units to the base stations and wherein the repeater system is employed in the downlink direction only. The amplifier may include circuitry therein to substantially prevent saturation. The amplifier may provide an external indication of the magnitude of amplification. The receive and transmit antennas may be isolated from each other using cross-polarization achieved by mechanical orientation or by electrical rotation. The receive and transmit antennas may be isolated from each other using a metallic chassis. The amplification may be limited in magnitude to maintain the capacity of the mobile communications system to support link imbalance.

Another aspect of the present invention relates to a repeater for a mobile communication system having a plurality of base stations and subscriber units that communicate via RF signals. The repeater includes a receive antenna located in an environment receiving signals of adequate signal strength from multiple base stations, the receive antenna being directed toward one of the base stations to receive transmitted RF signals from the base station, the receive antenna generating a received signal therefrom. The repeater also includes an amplifier receptive of the received signal, the amplifier amplifying the level of the received signal to generate an amplified signal. The repeater further includes a transmit antenna located proximate to the receive antenna and also located in an environment receiving signals of adequate signal strength from multiple base stations, the transmit antenna being receptive of the amplified signal, the transmit antenna transmitting RF signals within a local area to subscriber units located nearby and also receiving signals of adequate signal strength from multiple base stations.

Another aspect of the present invention relates to a repeater for a mobile communication system having a plurality of base stations and subscriber units that communicate via RF signals. The repeater includes a receive antenna that is directed toward one of the base stations to receive transmitted RF signals from the base station, the receive antenna generating a received signal therefrom. The repeater also includes an amplifier receptive of the received signal, the amplifier amplifying the level of the received signal to generate an amplified signal. The repeater further includes a transmit antenna located proximate to the receive antenna, the transmit antenna being receptive of the amplified signal, the transmit antenna transmitting RF signals within a local area to subscriber units located nearby. The receive and transmit antennas are located within two meters of each other. The mobile telecommunication system includes a downlink direction in which signals are transmitted from the base stations to the subscriber units and an uplink direction in which signals are transmitted from the subscriber units to the base stations and wherein the repeater system is employed in the downlink direction only.

Another aspect of the present invention relates to a repeater for a mobile communication system having a plurality of base stations and subscriber units that communicate via RF signals. The repeater includes a receive antenna that is directed toward one of the base stations to receive transmitted RF signals from the base station, the receive antenna generating a received signal therefrom. The repeater also includes an amplifier receptive of the received signal, the amplifier amplifying the level of the received signal to generate an amplified signal, the amplifier including circuitry therein to substantially prevent saturation by periodically incrementing the magnitude of amplification toward an oscillation condition and testing for same. The repeater further includes a transmit antenna located proximate to the receive antenna, the transmit antenna being receptive of the amplified signal, the transmit antenna transmitting RF signals within a local area to subscriber units located nearby.

Another aspect of the present invention relates to a method for substantially eliminating co-channel interference in a local area containing subscriber units receiving adequate signals from a plurality of base stations. The method includes co-locating a transmit antenna and a receive antenna within an environment receiving signals of adequate signal strength from multiple base stations to provide downlink-only amplification.

Link imbalance may be intentionally caused between the downlink and the uplink directions. The method may further include substantially preventing saturation by periodically testing for oscillation with a minimum of service interruption and then setting the amplification to a maximum magnitude. The method may further include providing an indication of the magnitude of amplification.

Numerous additional features and advantages of the present invention will become apparent to those skilled in the art upon consideration of the further description that follows.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with solving pilot pollution problems in high-rise buildings, it should be expressly understood that the present invention may be applicable to other applications where a solution to co-channel interference in strong signal environments is required/desired. In this regard, the following description of a system that solves pilot pollution problems in high-rise buildings is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
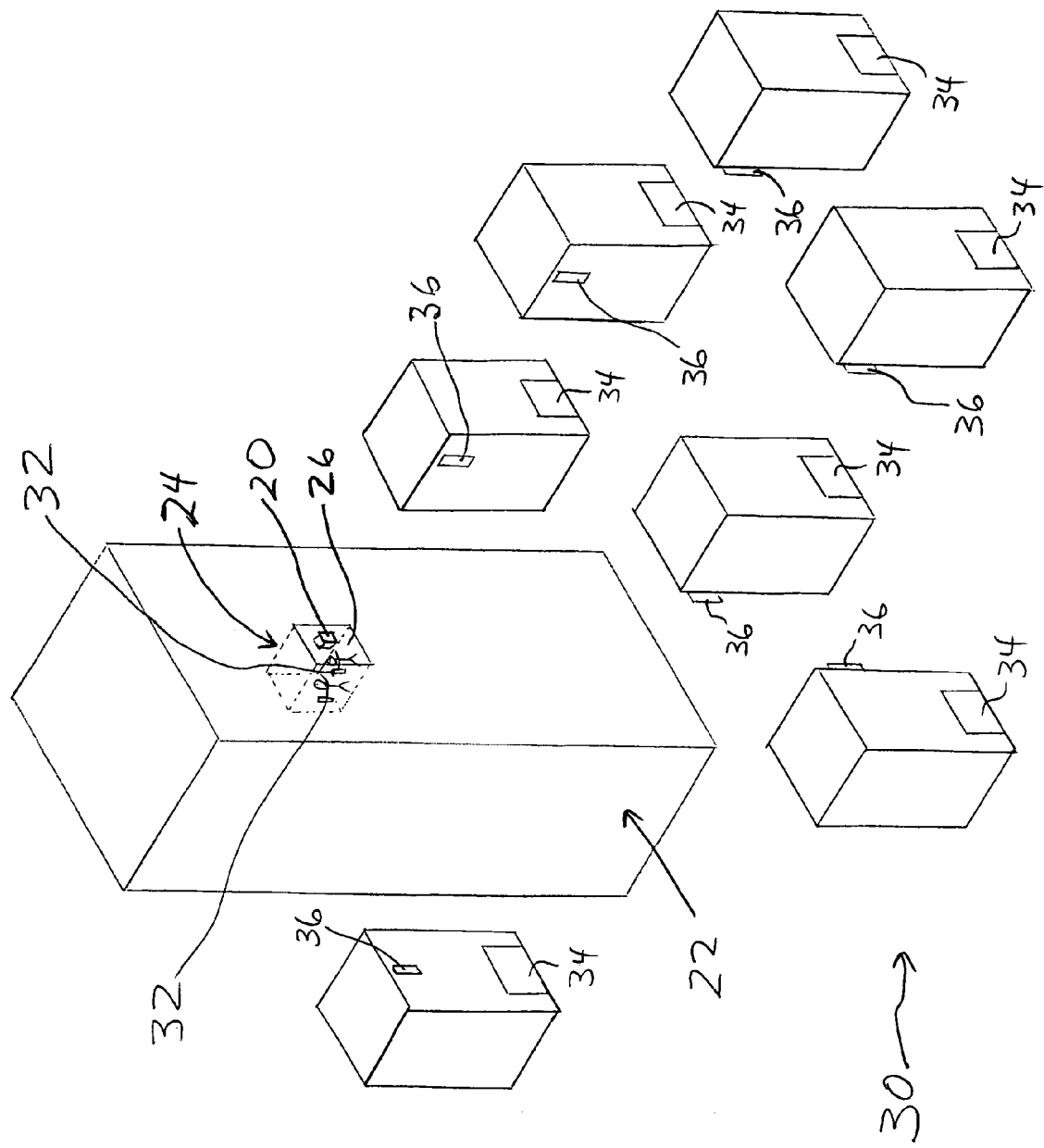
FIG. 1 is an illustration of the setting in which the repeater system of the present invention can be used.

A repeater system 20 of the present invention is shown in FIG. 1. As can be seen, the repeater system 20 is located in a high-rise building 22, in the interior of an external room 24 in the building, preferably near a window 26. As will be the case in the vicinity of most any high-rise building in the world, a mobile or cellular telephone system 30 exists in the surrounding area of the building 22. Located within or nearby the room 24 in the building 22 may be one or more subscriber units 32 (cellular or other wireless telephones).

The mobile telephone system 30 includes a plurality of base stations 34 located in the vicinity of the building 22. As is well known, each of these base stations 34 may operate at different transmit and receive frequencies than adjacent base stations for TDMA and GSM technology systems, while they may operate at the same transmit and receive frequencies as adjacent base stations for CDMA technology systems. While the present invention is not limited to application to CDMA systems, the embodiments described herein all may refer to CDMA systems, purely for convenience. Each base station 34 has an antenna system 36 associated therewith.

Figure 2:
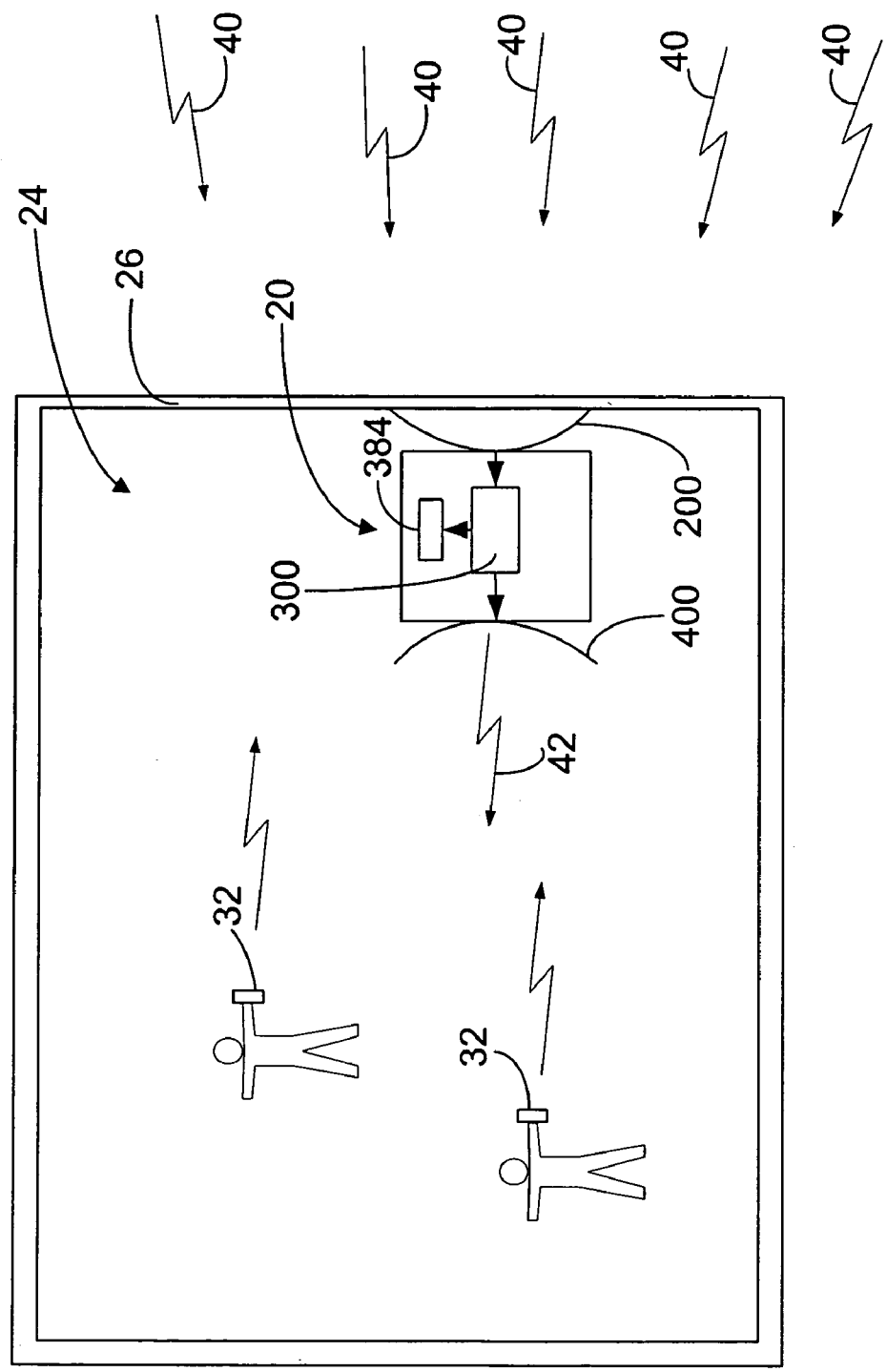
FIG. 2 is an illustration of a portion of the setting shown in FIG. 1.

As shown in FIG. 2, there may be several subscribers carrying subscriber units 32 in the room 24 having a window 26. It can be seen that there are many competing downlink signals 40 that would be potentially received by the subscriber units 32 were it not for the presence of the repeater system 20. The repeater system 20 receives selected ones of these downlink signals 40 via an antenna 200, amplifies them, and transmits an amplified downlink signal 42 from an antenna 400. Due to the relatively greater signal strength of the amplified downlink signal 42 in the vicinity of the repeater system 20, each of the subscriber units 32 use that signal 42 rather than the competing downlink signals 40. The subscriber units 32 send uplink signals 44 directly back to the base station in conventional fashion. There is no need for a repeater system for the uplink direction, although one could be employed if desired.

Figure 3:
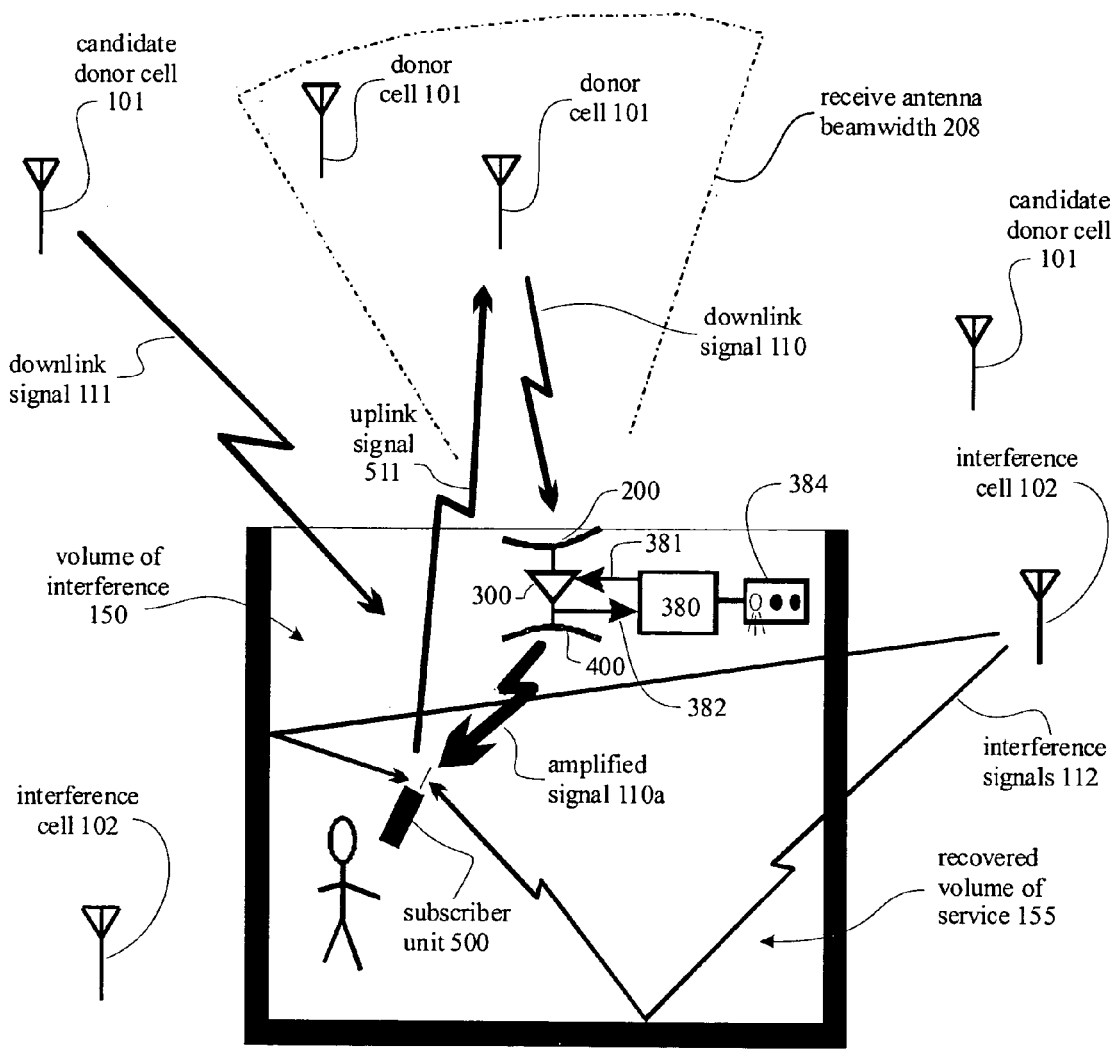
FIG. 3 is an illustration of repeater system of the present invention in a typical setting.

As shown in FIG. 3, a two-way cellular network 100 blankets the user area with many strong signals. The user area, generally an indoor office or apartment, resides in a strong signal environment (greater than −90 dBm), common to high-rise urban locations, and is receiving same-frequency signals from two or more base stations of the desired communication system (provider). Cellular network 100 is composed of cell sites (base stations), telephony switches, backhaul, and all other elements necessary to create a voice and data infrastructure. Network 100 provides wireless access to cellular subscriber units 500. Candidate donor cell sites 101 provide strong line-of-sight (LOS) communications signals 111 to the subscriber and signals 110 to repeater receive antenna 200, and signals 111 and 110 are approximately equal to each other, and uniform over the region of strong or adequate signal strength from multiple signals, which may be called the volume of interference. Often, these candidate donor cells can be visually seen through a window in the user area, and most of the energy contained in the LOS signals 110 lie within a relatively narrow range of azimuth, collectable with a moderately directional antenna 200 of beamwidth <180°, possibly in the range of 60° to 120°. Once signals 111 penetrate into a metallic environment, like a windowed office, reflection and diffraction on edges and surfaces spread the energy over a wider angle approaching 360°, reducing the fraction of available energy that can be collected from a directional antenna.

The complement to downlink donor-to-subscriber signal 111 is uplink subscriber-to-donor signal 511, which possesses approximately the same path loss after averaging out small-scale signal fading. A balanced path exists when the downlink path loss, defined as the difference between donor cell transmit power and subscriber received power, equals the uplink path loss, defined as the difference between subscriber transmit power and donor cell received power.

Interference cell sites 102 provide strong non-line-of-sight communications signals 112 to subscriber unit with much scattering by objects in the environment; signals arrive over a wide range of azimuth angles approaching 360 degrees. For instance, these signals 112 may bounce off other buildings and come through side walls before arriving in the user area. In general, signals from interference cells 102 (non-LOS) are not collectable, and do not represent qualified donor cells.

As one moves further into a scattering environment, such as a building, it becomes increasingly difficult to select specific donor cells using a directional antenna. Therefore, the best place to collect LOS or near-LOS signals is at the edge of a scattering environment, pointed away from scattering objects.

Co-channel interference 150 occurs when two or more AMPS, TDMA, or GSM signals of the same frequency are received by the subscriber within the volume of interference, at the same time, and at comparable signal levels (111 and 112). For CDMA, interference can occur when four or more signals of the same channel (111 and 112) are received in the user area at comparable signal levels, and the interference is called pilot pollution. A beacon signal called the pilot is always transmitted from each CDMA cell site, which subscribers select and receive in order to be ready for a call. When the subscriber unit is on but not in a call, co-channel interference (or pilot pollution) prevents a cellular call from initiating, or at least reduces the likelihood of a successful initiation (call set-up). When a two-way call is in progress, co-channel interference degrades call quality as signal conditions vary (which occurs as the subscriber unit wanders within the user area), and may cause the call to drop completely.

Figure 4:
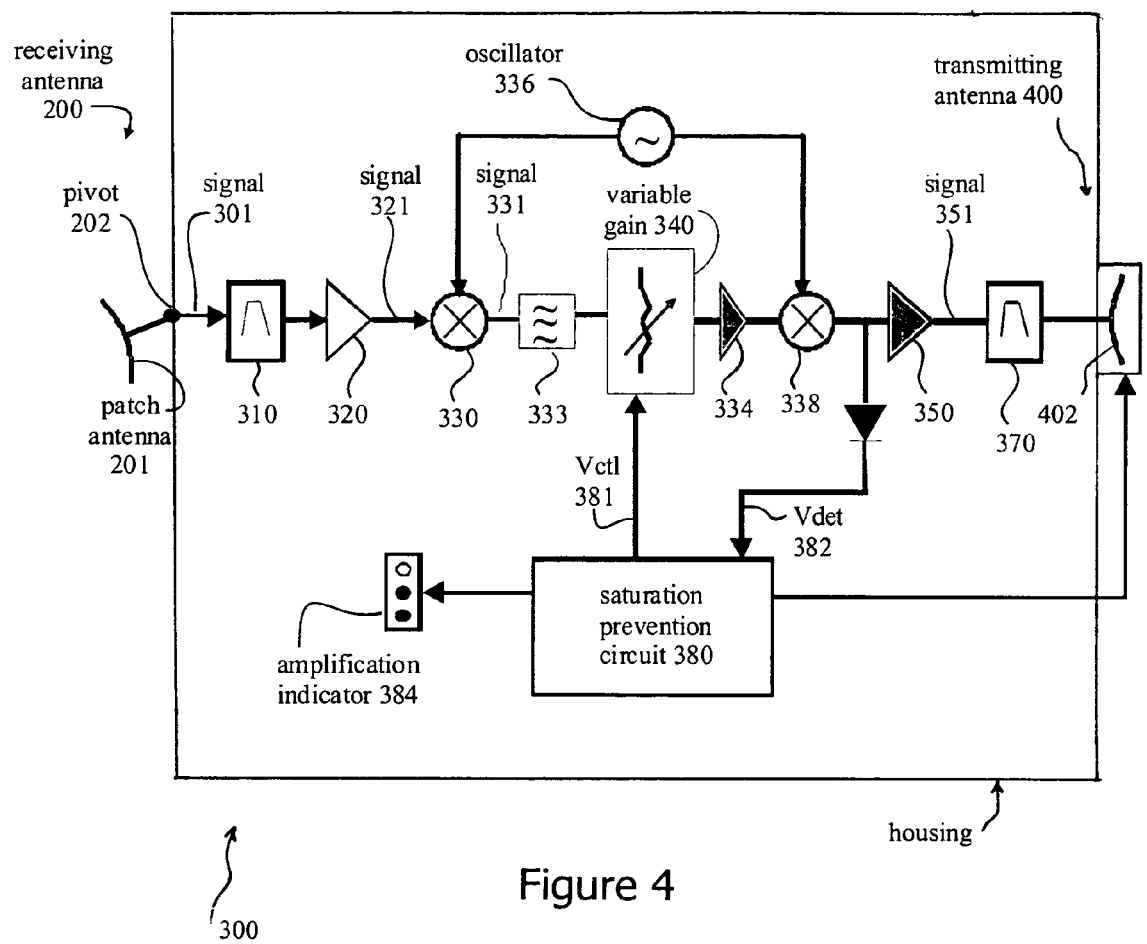
FIG. 4 is a block diagram of the repeater system of the present invention.

Directional receive antenna 200 (FIGS. 3 and 4) selects radio signals 110 from one to three candidate donor cells 101. Donor cell(s) transmitter 120 transmits a downlink cellular signal. A directional receive antenna 201, with a horizontal beamwidth 208 sufficiently wide to collect most of the power from each line-of-sight candidate cell 101, and sufficiently narrow to reject all but one to three candidate donor cells, and pointed typically out a window, converts the signal 110 available at the receive antenna into an electrical signal 301 (FIG. 4). All other candidate donor cells and most interference cells are rejected by the narrow beamwidth 208 of the receive antenna 201. Since the repeater is a short distance (typically less than ten meters) from the subscriber unit, receive signal 110 is approximately equal in strength to signal 111 available at the subscriber unit.

Figure 5:
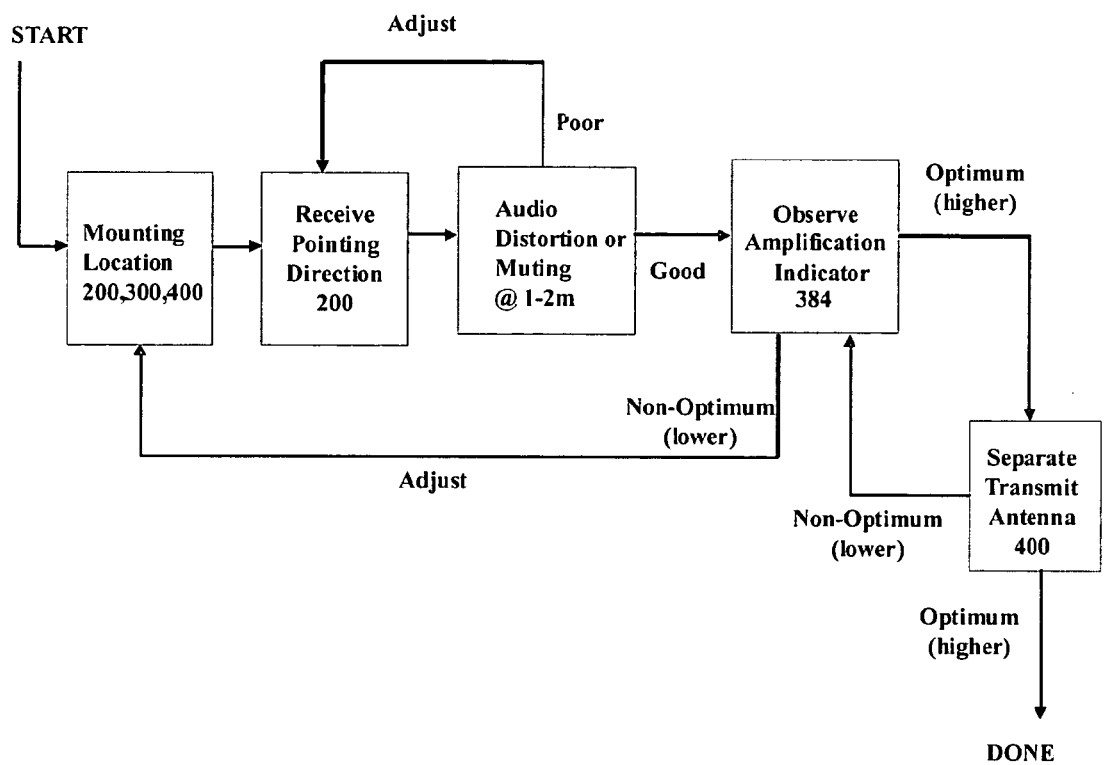
FIG. 5 is a block diagram of an algorithm of the present invention for optimally setting-up the repeater system of the present invention.

Optional pivot 202 allows the installer to point the receive antenna 201 in different directions in order to select one to three strong donor cells (FIG. 5). To install the repeater, the subscriber iterates the mounting location of repeater 20 and pointing angle of antenna 201 while monitoring downlink audio quality and the amplification indicator 384, until maximum amplification is obtained and audio quality is improved.

The amplifier chain 300 (FIG. 4) suitably amplifies the receive signal 110 for the downlink as follows. Electrical signal 301 passes through filter 310, which rejects signals other than those desired for user communication which either could cause electrical overload of the amplifier chain, or which, when amplified, could create interference for other users. Typically, this filter is wide enough to pass the entire PCS or cellular spectrum, or a licensed band within the PCS or cellular spectrum, and is narrow enough to reject the opposite link direction and other adjacent telecommunications services.

The amplifier 320 increases the amplitude of the received signals 301 as follows. Band-select or channel-select stages 330, 332, 333, 334, and 336 may be included for additional filtering, beyond that of filter 310, in the event more protection from, or less interference to, other telecommunications users is needed. Signal 321 is translated to an intermediate frequency by mixer 330. IF stage 333 filters the translated signal 331 to obtain the desired interference protection. Mixer 338 translates the intermediate frequency signal back to the original frequency of signal 321. Local oscillator (LO) 336 provides an un-modulated RF carrier to facilitate mixers 330 and 338.

Figure 6:
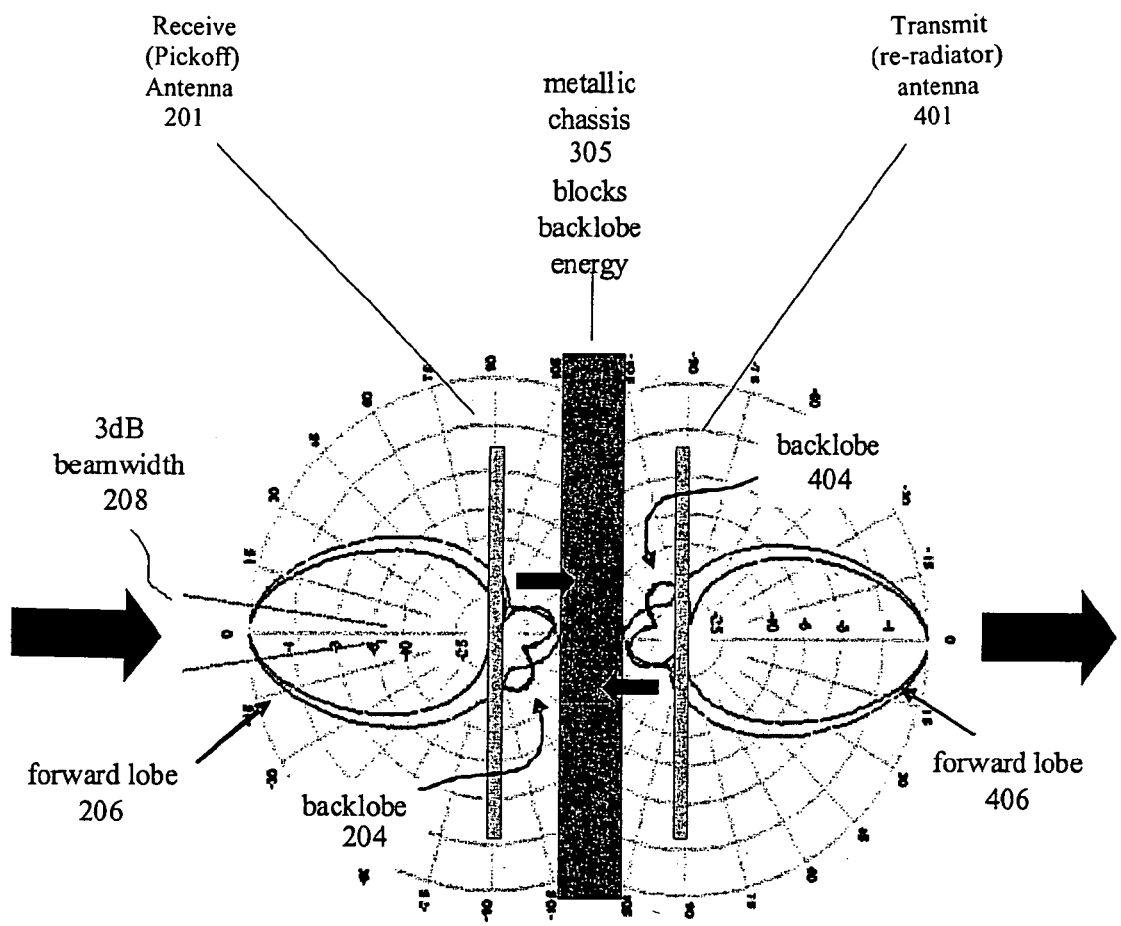
FIG. 6 is an illustration of typical RF energy patterns associated with the repeater system of the present invention.
Figure 7:
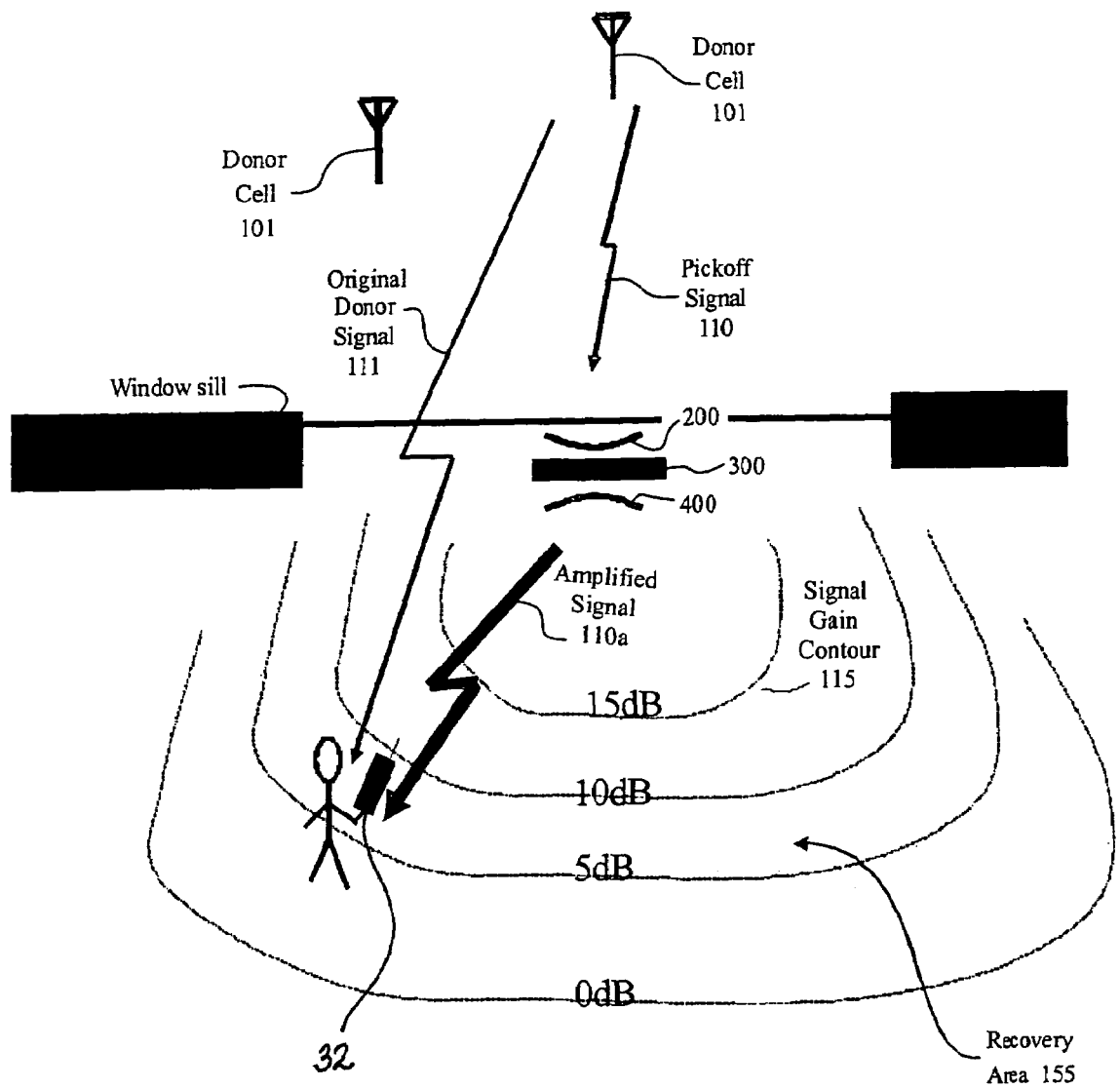
FIG. 7 is a map of approximate values of RF energy associated with the repeater system of the present invention.

Variable attenuation stage 340 reduces the amplified signal 321 to keep the overall amplifier chain from causing excessive power output due to oscillation or excessively strong input signals. Oscillation can occur if receive antenna 201 and transmit antenna 401 are not electrically isolated by an amount greater than the amplification of the amplifier chain. FIGS. 6 and 7 provide some illustration of RF signal levels in the vicinity of the repeater system and the subscriber unit 32.

Amplifier 350 provides final amplification to signal 301 necessary to achieve the desired and stable amplification for the amplifier chain. The amplified signal 351 is measured by detector 360 to determine if output power exceeds a preset threshold approaching saturation, indicating oscillation or excessively strong input signals. Filter 370 performs final filtering to prevent interference to other telecommunications users and systems.

Amplifier chain 300 limits the maximum amplification to a level which permits reliable communications within the capacity of the system to support imbalanced operation.

Figure 8:
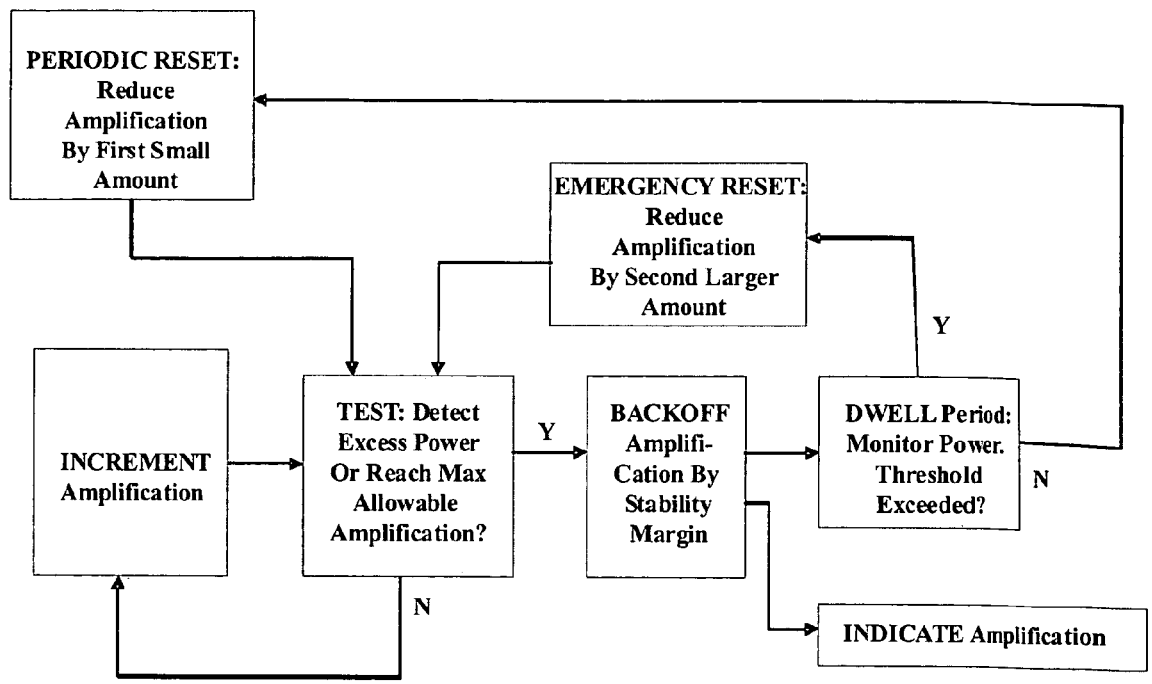
FIG. 8 is a block diagram of an algorithm of the present invention for preventing saturation with the repeater system of the present invention.

Saturation-prevention circuit and algorithm 380 maximizes the amplification while avoiding oscillation. Since the receive antenna 201 and transmit antenna 401 are co-located, the electrical isolation may not be sufficient to allow maximum available amplification from the amplifier chain without oscillation. Electrical isolation will vary over time as the user moves about the user area. An automatic saturation-prevention circuit and algorithm is therefore needed to test for oscillation and to set the amplification at just below that which causes oscillation, as shown in FIG. 8, and in a way that minimizes interruption to the call in progress.

Figure 9:
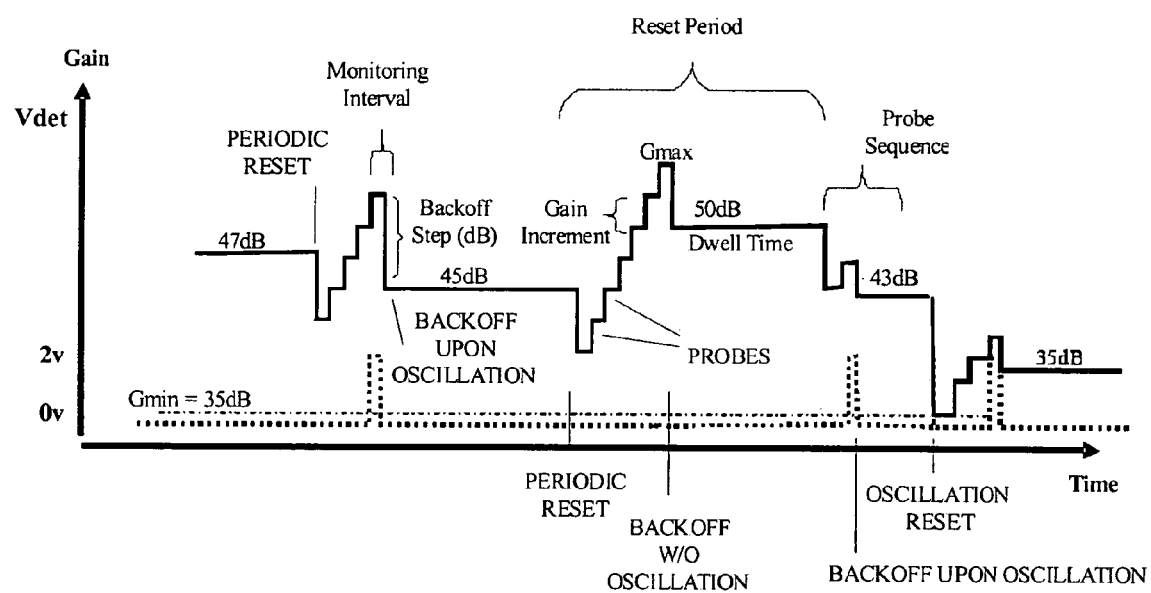
FIG. 9 is a plot of the amplification gain of the repeater system of the present invention during various stages of the algorithm shown in FIG. 8.

A plot of the amplification gain of the repeater system 20 during various stages of this algorithm is shown in FIG. 9.

The following is a description of a probe sequence used to maximize usable amplification without oscillation while minimizing service interruptions. The saturation prevention algorithm includes a reset to lower amplification where oscillation is unlikely to occur, measuring the detector for excessive power, incrementing the amplification in steps, detecting excessive power, backing off amplification by a stability margin which guarantees a high likelihood of stability over the next steady-amplification period, and dwelling at the new amplification setting while monitoring the detector for occasional oscillation occurrences.

After being at steady-state amplification for the dwell period (typically 1 second), the first step of the probe sequence is to reset overall amplification to a first lower amount than that of the preceding dwell period by reducing control voltage 381. Amplification is set to typically two to eight dB lower. The goal is to avoid resetting amplification to an excessively lower level which would require a longer incrementing sequence, and potential call interruption. Amplification remains at the new amplification step just long enough for the amplifier to respond to a potential oscillation situation.

Detected voltage 382 is measured to see if it has exceeded the preset saturation threshold, indicating oscillation. If the threshold 382 has not been exceeded, then there is no oscillation, and the probe sequence advances to the next higher amplification step, established by incrementing control voltage 381. Amplification is stepped upwards until either maximum amplification is reached, or excess power occurs. When either maximum amplification or the saturation threshold is reached, amplification is reduced by a stability margin (typically 5 dB) and parked at that level for the remainder of the dwell period.

The dwell period is set so that the amount of change in the isolation between the transmit and receive antennas since the last stability test is usually less than the stability margin, in order to minimize the interruptions to repeater coverage. During the dwell (constant amplification) period, detector voltage 382 is monitored in case a rapid change in the environment causes isolation to drop significantly, causing oscillation. If voltage 382 exceeds its threshold during the dwell period, amplification is reduced by a second and larger amount via control voltage 381, guaranteeing an immediate return to stability, and a longer probe sequence initiates in order to maximize stable amplification, as above. This probe sequence caused by a rapid change in isolation is longer than the typical periodic probe sequence, but is far less frequent. The frequency of periodic probe sequences is chosen to track isolation changes quickly enough to allow a small stability margin, resulting in higher amplification, yet slowly enough to minimize potential interruptions to the call in progress, allowing maximum call quality.

Transmit antenna 400 illuminates the user area, and is isolated from receive antenna 200. Amplified donor cells are transmitted into the user's area, creating a dominant set of signals from donor cells and overtaking the interference cells. Antennas 200 and 400 are isolated to maximize allowable amplification. Antenna isolation can achieved through cross-polarization between 201 and 401, by metallic shielding of chassis 305, through optimizing the position of the chassis, and/or by small physical separation within the volume of interference 150. An amplification indicator 384 displays the amount of amplification so the user can pick the mounting location for highest isolation and maximum allowable amplification. Amplification indicator may be a visible indicator such as an LED display, an LCD display, or other suitable type of visible indicator, or it may be an audio signal whose frequency changes in proportion to amplification, or other suitable audible indicator.

Donor cell signal 371, being an appropriately-amplified version of selected donor cell signal 110, passes to transmit directional antenna 401, which is pointed into the user area, usually an office or apartment. The beamwidth and pointing direction of antenna 400 is chosen to maximally illuminate a volume of recovered service 155. Antenna 400 establishes dominant donor signal(s) 110a at the subscriber unit and within the user area.

Donor signal gain 115 is equal to P110a–P110, dominating the interference signals 112 by at least several dB at the edge of the recovered volume 155, and by typically 20 dB at 1 m. The signal gain 115 experienced by the subscriber corresponds to the magnitude of the imbalance introduced by the repeater. Antennas 200 and 400 are collated in the same room, generally in the same mechanical package, and also isolated electrically to allow maximum possible amplification. A back-to-back orientation, which points the lowest-amplification portions of each antennas pattern (204, 404) toward each other, creates typically 30 dB of isolation (FIG. 6). Repeater chassis 305 is metallic and provides additional electrical isolation between antennas 200 and 400. The polarization of antennas 200 and 400 may be set to 90° to acquire an additional 5–30 dB of isolation. Transmit antenna 400 can be detached from chassis 305 and separated by several feet in order to increase isolation further. Additionally, techniques to electrically rotate the polarization of one antenna, with respect to the other antenna, may be employed, automatically optimized by saturation prevention circuit 380.

Antenna separation is allowed as long as the conditions for co-location are maintained. Co-location exists if both antennas lie within the volume of interference common to the subscriber unit, and as long as both antennas are approximately in the same plane (e.g. a generally vertical plane), such that the signal gain 115 is the same as when the antennas are physically co-located. Because donor signal strength is approximately uniform across a small area, such as a windowed room, collocating the antennas establishes a fixed signal gain, given a maximum amplification, over the donor signal that the subscriber would receive without a repeater. Co-location and limited amplification, then, create a repeater system which operates within the capacity of the system to support imbalanced downlink operation. Since the donor signals are LOS or near-LOS, downlink signal fading is modest or minimal, freeing up a reserve capacity for the system to support imbalance which can be applied to the repeater system. Additionally, uplink space diversity is preserved since there is no uplink amplification between the subscriber and the donor cell, and therefore combined uplink fading is minimal, whereas a conventional coverage repeater would eliminate uplink diversity, creating a downlink imbalance of its own.

One procedure for installing and optimizing the repeater (200, 300, 400) is shown in FIG. 5. The repeater is mounted near or on a window, or pointed towards line-of-sight donor cells 101. Standing at one to two meters distance from and in front of the transmit antenna 401, having established a call, the user monitors the received audio of subscriber unit 500 for muting (audio signal break-up) and adjusts the pointing angle of antenna 201 until minimal audio muting or degradation occurs. Then, the user adjusts the mounting location of repeater (200, 300, 400) to obtain maximum amplification as shown on the amplification indicator 384.

Amplification indicator 384 indicates the amplification during the dwell periods, which changes each second or so. If the amplification is not usually high enough for the tried location, the user tries another location and then moves about the room, observing the amplification levels. The user mounts the repeater, if possible, away from large metallic reflectors, like window sills or office furniture. Mounting location and pointing angle are iterated until good service is re-established over the largest possible area. If a high amplification location is not found, transmit antenna 400 can be separated from chassis 305, using coax 402, and moved elsewhere within the volume of interference, preferably keeping both antennas close together and in the same vertical plane. For example, placing the receive antenna in front of the window and the transmit antenna on the adjacent wall one to two meters away, in the same plane, maintains the same signal gain 115 while increasing isolation between the two antennas. In an alternate installation algorithm, the received signal strength indication 525 provided by subscriber unit may be used in conjunction with the amplification indicator 384 and the received audio quality in order to optimize repeater mounting location and antenna pointing angle.

Figure 10:
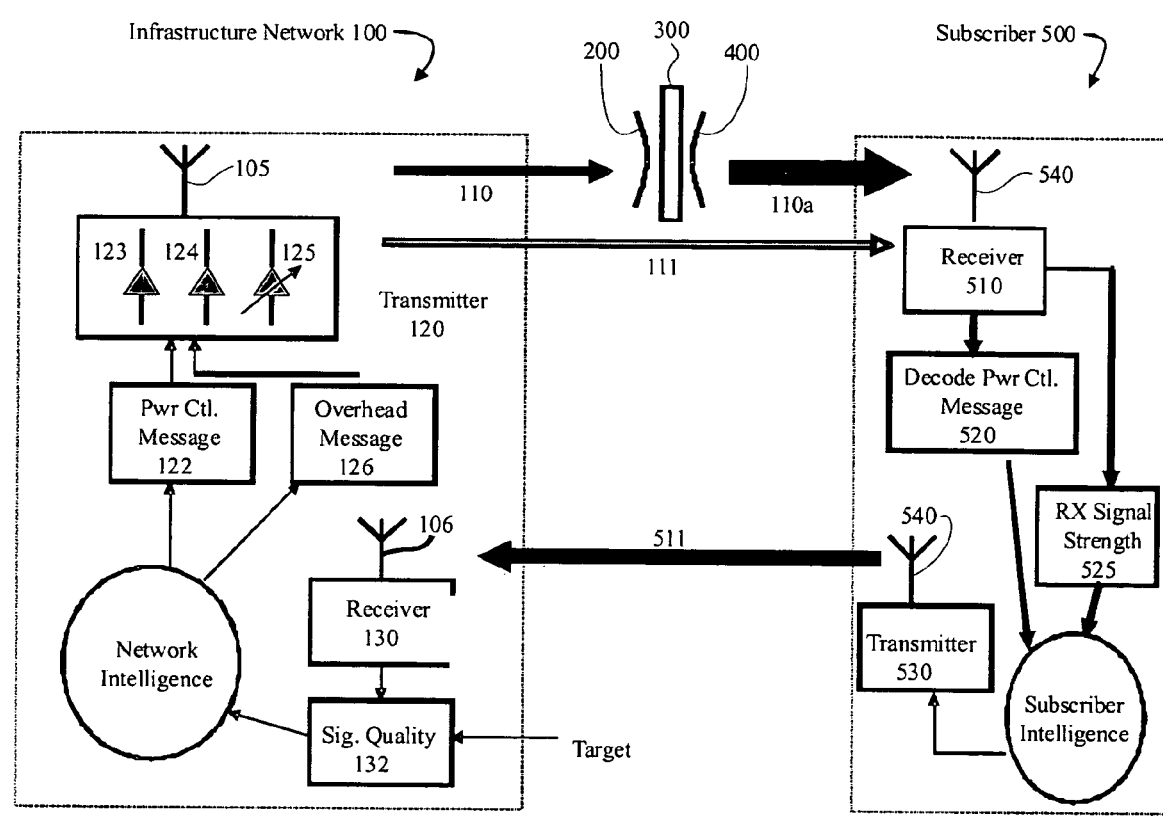
FIG. 10 is an illustration of the signals sent and received by and from a base station and a subscriber unit when the repeater system of the present invention is employed.

Subscriber unit 500 receives downlink signals 110a and transmit uplink signals 511 to the network (FIG. 10). The cellular subscriber unit receives a signal 110a from the selected donor cell(s) which is greater in amplitude than the ambient signals 110 and 111, eliminating co-channel interference. Power control messages 520 instruct the subscriber unit how much power to transmit to meet the network's requirements for good uplink signal quality. Since the downlink is amplified, the subscriber unit reports that it appears to be closer to the cell site than previously, and thus might otherwise think it does not need to transmit as much power.

Amplified downlink signal 110a, radiated from antenna 400, is received by subscriber 500 via antenna 540, defeating co-channel interference. Received signal 110a is stronger than ambient signals 110 and 111, and is sufficient to overcome the interference from cells 102 over the user area. The downlink is now amplified ($P_{110}$–$P_{110a}$ is typically 5–20 dB) over a small area (typically one to ten meters), creating an island of improved service. Contours of signal gain 115 decrease as the user moves away from transmit antenna 400, until finally the difference between ambient 110 and boosted 110a signals is 0 dB, creating a smooth transition to the remainder of the indoor environment.

Receiver 510 decodes voice and data messages for the user, as well as power control messages 520 from the network 100. Subscriber transmitter 530 transmits a signal 511 back to cells 101, received by cell site antenna 106. Receiver 130 receives the subscriber transmission, including the signal 110a strength level 525. Reported subscriber received signal strength 525 gives the network an estimate of where the open-loop operating point is for subscriber transmit power.

Network signal quality 132 is measured for the user and compared to a target uplink quality level. Power control message 122 directs the subscriber to either increase or decrease it's transmit power, based on signal quality indicator 132, and according to closed-loop power control protocol. Transmitter 120 transmits the encoded message and call control information to the subscriber 500.

During a call, network 100 calculates the difference between the open-loop subscriber power set point (as reported by the subscriber) and the closed-loop subscriber power set point (as determined by signal quality indicator 132). Some imbalance is allowed, typically 24 dB or more. This is necessary because the uplink and downlink signals are often faded momentarily by 10–20 dB, and can be in opposite directions, resulting in 30–40 dB of instantaneous imbalance in path loss between up and downlinks.

During call set-up, subscriber unit 500 uses signal strength indicator 525 to estimate what power to transmit with, based on receipt of boosted donor cell site signal 110a, and using the open-loop power control algorithm (typical TxPower=−73−RSSI (525) dBm). Access probes are sent at minimal power levels, then the power is increased in successive probe sequences, until the network responds to the subscriber's request for a talk channel. Since signal 110a is stronger than the un-boosted donor-cell signal 111 by the boost (typically 5–20 dB), the probe sequence will need to rise by about that amount until a call can be set up. Fortunately, the CDMA system allows typically the probes to increase by 32 dB. At some level of repeater boost, call set-up will be delayed or prevented.

Amplified downlink signal 110a, radiated from antenna 401, is received within the user area by subscriber 500 via antenna 540, rising above the interference signal 112 and defeating co-channel interference. Received signal 110a is stronger than the original donor cell signal 111 by the gain amount 115, typical by 5–20 dB. Initial subscriber power from subscriber transmitter 530, attempting to access the system, is lower, by gain 115, than that needed for immediate call set-up because the subscriber unit assumes that the uplink path loss related to signal 511 is the same as the downlink path loss related to signal 110a.

Access probes from transmitter 530 are successively increased in power until the signal quality 132 is sufficient and recognized by the network. The amount that the probes can rise above an open-loop (or ambient) operating point must be equal to or greater than the amount of dominance provided by the repeater over the user area. This amount is typically 32 dB. A talk channel is then assigned by cell site(s) 101 and transmitted to the subscriber by transmitter 120. Network probe parameters, part of overhead messaging 126, is adjusted as necessary to establish the headroom necessary to overcome the dominance.

As can be appreciated the present invention intentionally imbalances the downlink and uplink directions by inserting a repeater into the downlink direction. In other words, the repeater system of the present invention provides non-zero differential gain in a local area. It has been discovered that it is the downlink direction that is most affected by pilot pollution. Providing a repeater in only one direction is advantageous because it greatly reduces the cost of an individual solution to co-channel interference, eliminates the need for skilled installation, and eliminates the need for spectrum oversight and repeater monitoring for malfunction. Furthermore, the amount of signal gain is controlled to be within the mobile communication system's capability to support imbalance. Also, the repeater system may work best in areas of island coverage (e.g., where hand-offs are not needed).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A repeater for a mobile communication system having a plurality of base stations and subscriber units that communicate via RF signals, comprising:
    a receive antenna that is directed toward one of the base stations to receive transmitted RF signals from the base station, the receive antenna generating a received signal therefrom;
    an amplifier receptive of the received signal, the amplifier amplifying the level of the received signal to generate an amplified signal; and
    a transmit antenna located proximate to the receive antenna, the transmit antenna being receptive of the amplified signal, the transmit antenna transmitting RF signals within a local area to subscriber units located nearby;
    wherein the repeater operates in the downlink direction between the base station and the subscriber units near the repeater and the presence of the repeater in the downlink direction causes an intentional imbalance in total losses between the downlink and the uplink directions.

2. A repeater as defined in claim 1, wherein the RF signals received by the receive antenna and the RF signals transmitted by the transmit antenna are at substantially the same frequency.

3. A repeater as defined in claim 1, further including a repeater housing in which the receive and transmit antennas are located.

4. A repeater as defined in claim 1, wherein the receive and transmit antennas are located within two meters of each other.

5. A repeater as defined in claim 1, wherein the amplifier provides an external indication of the magnitude of amplification.

6. A repeater as defined in claim 1, wherein the amplifier includes circuitry therein to substantially prevent saturation.

7. A repeater as defined in claim 6, wherein the circuitry substantially prevents saturation by periodically incrementing the magnitude of amplification toward an oscillation condition and testing for same.

8. A repeater as defined in claim 7, wherein the circuitry resets the magnitude of amplification to a smaller level during periodic testing for oscillation, and to a much smaller level for sudden occurrences of oscillation, in order to minimize the length of time for which steady amplification is interrupted.

9. A repeater as defined in claim 1, wherein the subscriber can optimally position the receive and transmit antennas of the repeater.

10. A repeater as defined in claim 9, wherein the subscriber uses received audio quality when using the subscriber unit to optimally position the receive and transmit antennas of the repeater.

11. A repeater as defined in claim 9, wherein the amplifier provides an external indication of the magnitude of amplification and wherein the subscriber uses the external indication to optimally position the receive and transmit antennas of the repeater.

12. A repeater as defined in claim 9, wherein the subscriber units include an indication of received signal strength and wherein the subscriber uses the indication to optimally position the receive and transmit antennas of the repeater.

13. A repeater as defined in claim 1, wherein the repeater is effective in substantially eliminating co-channel interference in the vicinity of the repeater.

14. A repeater as defined in claim 1, wherein the repeater is effective in substantially eliminating co-channel interference within ten meters of the repeater.

15. A repeater as defined in claim 1, wherein the subscriber units and the receive and transmit antennas of the repeater are all located in the vicinity of each other and all are in an environment receiving signals of adequate signal strength from multiple base stations.

16. A repeater as defined in claim 15, wherein the amplifier includes circuitry therein to substantially prevent saturation.

17. A repeater as defined in claim 1, wherein the mobile telecommunication system includes a downlink direction in which signals are transmitted from the base stations to the subscriber units and an uplink direction in which signals are transmitted from the subscriber units to the base stations and wherein the repeater system is employed in the downlink direction only.

18. A repeater as defined in claim 17, wherein the amplifier includes circuitry therein to substantially prevent saturation.

19. A repeater as defined in claim 18, wherein the amplifier provides an external indication of the magnitude of amplification.

20. A repeater as defined in claim 1, wherein the receive and transmit antennas are isolated from each other using cross-polarization achieved by mechanical orientation or by electrical rotation.

21. A repeater as defined in claim 1, wherein the receive and transmit antennas are isolated from each other using a metallic chassis.

22. A repeater as defined in claim 1, wherein the amplification is limited in magnitude to maintain the capacity of the mobile communications system to support link imbalance.

23. A repeater for a mobile communication system having a plurality of base stations and subscriber units that communicate via RF signals, comprising:
    a receive antenna located in an environment receiving signals of adequate signal strength from multiple base stations, the receive antenna being directed toward one of the base stations to receive transmitted RF signals from the base station, the receive antenna generating a received signal therefrom;
    an amplifier receptive of the received signal, the amplifier amplifying the level of the received signal to generate an amplified signal; and
    a transmit antenna located proximate to the receive antenna and also located in an environment receiving signals of adequate signal strength from multiple base stations, the transmit antenna being receptive of the amplified signal, the transmit antenna transmitting RF signals within a local area to subscriber units located nearby and also receiving signals of adequate signal strength from multiple base stations;
    wherein the mobile telecommunication system includes a downlink direction in which signals are transmitted from the base stations to the subscriber units and an uplink direction in which signals are transmitted from the subscriber units to the base stations, and wherein the presence of the repeater in the downlink direction causes an intentional imbalance in total losses between the downlink and the uplink directions.

24. A repeater as defined in claim 23, wherein the amplifier includes circuitry therein to substantially prevent saturation.

25. A repeater as defined in claim 23, wherein the amplification is limited in magnitude to maintain the capacity of the mobile communications system to support link imbalance.

26. A repeater for a mobile communication system having a plurality of base stations and subscriber units that communicate via RF signals, comprising:
  a receive antenna located in an environment receiving signals of adequate signal strength from multiple base stations, the receive antenna being directed toward one of the base stations to receive transmitted RF signals from the base station, the receive antenna generating a received signal therefrom;
  an amplifier receptive of the received signal, the amplifier amplifying the level of the received signal to generate an amplified signal; and
  a transmit antenna located proximate to the receive antenna and also located in an environment receiving signals of adequate signal strength from multiple base stations, the transmit antenna being receptive of the amplified signal, the transmit antenna transmitting RF signals within a local area to subscriber units located nearby and also receiving signals of adequate signal strength from multiple base stations;
  wherein the mobile telecommunication system includes a downlink direction in which signals are transmitted from the base stations to the subscriber units and an uplink direction in which signals are transmitted from the subscriber units to the base stations and wherein the repeater system is employed in the downlink direction only.

27. A repeater for a mobile communication system having a plurality of base stations and subscriber units that communicate via RF signals, comprising:
  a receive antenna that is directed toward one of the base stations to receive transmitted RF signals from the base station, the receive antenna generating a received signal therefrom;
  an amplifier receptive of the received signal, the amplifier amplifying the level of the received signal to generate an amplified signal; and
  a transmit antenna located proximate to the receive antenna, the transmit antenna being receptive of the amplified signal, the transmit antenna transmitting RF signals within a local area to subscriber units located nearby;
  wherein the receive and transmit antennas are located within two meters of each other;
  wherein the mobile telecommunication system includes a downlink direction in which signals are transmitted from the base stations to the subscriber units and an uplink direction in which signals are transmitted from the subscriber units to the base stations and wherein the repeater system is employed in the downlink direction only.

28. A repeater as defined in claim 27, wherein the RF signals received by the receive antenna and the RF signals transmitted by the transmit antenna are at substantially the same frequency.

29. A repeater as defined in claim 27, further including a repeater housing in which the receive and transmit antennas are located.

30. A repeater as defined in claim 27, wherein the presence of the repeater in the downlink direction causes an intentional imbalance in total losses between the downlink and the uplink directions.

31. A repeater as defined in claim 30, wherein the amplifier includes circuitry therein to substantially prevent saturation.

32. A repeater as defined in claim 30, wherein the amplification is limited in magnitude to maintain the capacity of the mobile communication system to support link imbalance.

33. A repeater as defined in claim 27, wherein the amplifier includes circuitry therein to substantially prevent saturation.

34. A repeater as defined in claim 27, wherein the amplifier provides an external indication of the magnitude of amplification.

35. A repeater as defined in claim 27, wherein the subscriber can optimally position the receive and transmit antennas of the repeater.

36. A repeater as defined in claim 35, wherein the subscriber uses received audio quality when using the subscriber unit to optimally position the receive and transmit antennas of the repeater.

37. A repeater as defined in claim 35, wherein the amplifier provides an external indication of amplification and wherein the subscriber uses the external indication to optimally position the receive and transmit antennas of the repeater.

38. A repeater as defined in claim 35, wherein the subscriber units include an indication of received signal strength and wherein the subscriber uses the indication to optimally position the receive and transmit antennas of the repeater.

39. A repeater as defined in claim 27, wherein the repeater is effective in substantially eliminating co-channel interference in the vicinity of the repeater.

40. A repeater as defined in claim 27, wherein the repeater is effective in substantially eliminating co-channel interference within ten meters of the repeater.

41. A repeater as defined in claim 27, wherein the subscriber units and the receive and transmit antennas of the repeater are all located in the vicinity of each other and all are receiving signals of adequate signal strength from multiple base stations.

42. A repeater as defined in claim 27, wherein the receive and transmit antennas are isolated from each other using cross-polarization achieved by mechanical orientation or by electrical rotation.

43. A repeater as defined in claim 27, wherein the receive and transmit antennas are isolated from each other using a metallic chassis.

44. A repeater for a mobile communication system having a plurality of base stations and subscriber units that communicate via RF signals, comprising:
  a receive antenna that is directed toward one of the base stations to receive transmitted RF signals from the base station, the receive antenna generating a received signal therefrom;
  an amplifier receptive of the received signal, the amplifier amplifying the level of the received signal to generate an amplified signal, the amplifier including circuitry therein to substantially prevent saturation by periodically incrementing the magnitude of amplification toward an oscillation condition and testing for same; and
  a transmit antenna located proximate to the receive antenna, the transmit antenna being receptive of the amplified signal, the transmit antenna transmitting RF signals within a local area to subscriber units located nearby.

45. A repeater as defined in claim 44, wherein the RF signals received by the receive antenna and the RF signals transmitted by the transmit antenna are at substantially the same frequency.

46. A repeater as defined in claim 44, further including a repeater housing in which the receive and transmit antennas are located.

47. A repeater as defined in claim 44, wherein the receive and transmit antennas are located within two meters of each other.

48. A repeater as defined in claim 44, wherein the mobile telecommunication system includes a downlink direction in which signals are transmitted from the base stations to the subscriber units and an uplink direction in which signals are transmitted from the subscriber units to the base stations, and wherein the presence of the repeater in the downlink direction causes an intentional imbalance in total losses between the downlink and the uplink directions.

49. A repeater as defined in claim 48, wherein the amplification is limited in magnitude to maintain the capacity of the mobile communication system to support link imbalance.

50. A repeater as defined in claim 44, wherein the amplifier provides an external indication of the magnitude of amplification.

51. A repeater as defined in claim 44, wherein the subscriber can optimally position the receive and transmit antennas of the repeater.

52. A repeater as defined in claim 51, wherein the subscriber uses received audio quality when using the subscriber unit to optimally position the receive and transmit antennas of the repeater.

53. A repeater as defined in claim 51, wherein the amplifier provides an external indication of amplification and wherein the subscriber uses the external indication to optimally position the receive and transmit antennas of the repeater.

54. A repeater as defined in claim 51, wherein the subscriber units include an indication of received signal strength and wherein the subscriber uses the indication to optimally position the receive and transmit antennas of the repeater.

55. A repeater as defined in claim 44, wherein the repeater is effective in substantially eliminating co-channel interference in the vicinity of the repeater.

56. A repeater as defined in claim 44, wherein the repeater is effective in substantially eliminating co-channel interference within ten meters of the repeater.

57. A repeater as defined in claim 44, wherein the subscriber units and the receive and transmit antennas of the repeater are all located in the vicinity of each other and all are receiving signals of adequate signal strength from multiple base stations.

58. A repeater as defined in claim 44, wherein the mobile telecommunication system includes a downlink direction in which signals are transmitted from the base stations to the subscriber units and an uplink direction in which signals are transmitted from the subscriber units to the base stations and wherein the repeater system is employed in the downlink direction only.

59. A repeater as defined in claim 44, wherein the receive and transmit antennas are isolated from each other using cross-polarization achieved by mechanical orientation or by electrical rotation.

60. A repeater as defined in claim 44, wherein the receive and transmit antennas are isolated from each other using a metallic chassis.

61. A repeater as defined in claim 44, wherein the saturation-prevention circuitry resets the magnitude of amplification to a smaller level during periodic testing for oscillation, and to a much smaller level for sudden occurrences of oscillation, in order to minimize the length of time for which steady amplification is interrupted.

62. A method for substantially eliminating co-channel interference in a local area containing subscriber units receiving adequate signals from a plurality of base stations, comprising:

co-locating a transmit antenna and a receive antenna within an environment receiving signals of adequate signal strength from multiple base stations to provide downlink-only amplification;

further including substantially preventing saturation by periodically testing for oscillation with a minimum of service interruption and then setting the amplification to a maximum magnitude.

* * * * *